April 28, 1970     R. W. ASTHEIMER     3,509,345
LIGHT MODULATION MEANS FOR AN INFRARED THERMOGRAPH
Filed July 5, 1968
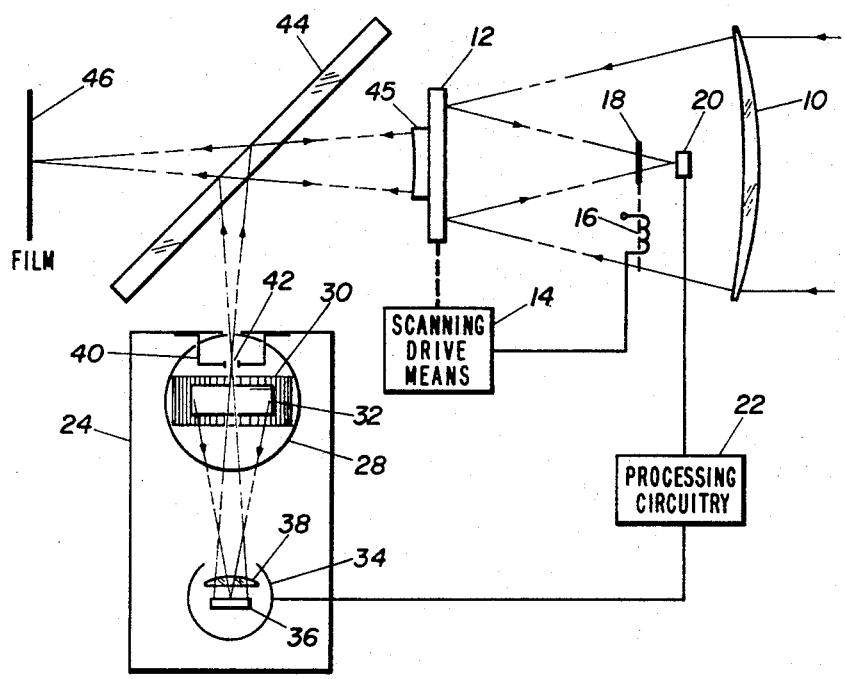
Fig_1
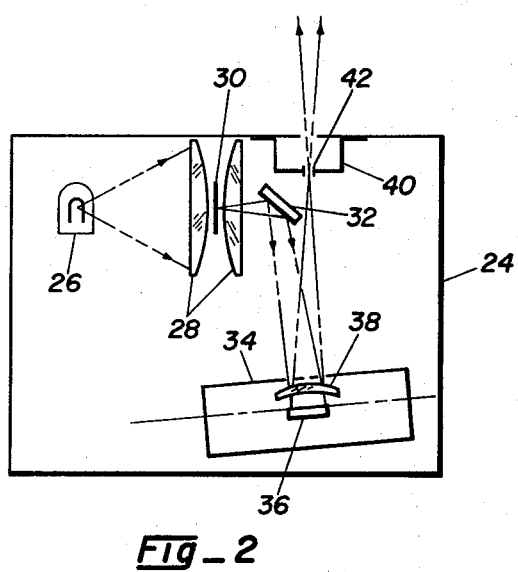
Fig_2
INVENTOR
ROBERT W. ASTHEIMER
BY
ATTORNEY

United States Patent Office 3,509,345
Patented Apr. 28, 1970

3,509,345
LIGHT MODULATION MEANS FOR AN INFRARED THERMOGRAPH
Robert W. Astheimer, Westport, Conn., assignor to Barnes Engineering Company, Stamford, Conn., a corporation of Delaware
Filed July 3, 1968, Ser. No. 742,340
Int. Cl. G01t 1/16
U.S. Cl. 250—83.3         4 Claims

ABSTRACT OF THE DISCLOSURE

An infrared thermograph is provided which synchronously scans an infrared detector over a field of view and a constant brightness light source over a light sensitive surface to produce a thermal image of the field of view of the thermograph. The constant brightness light source, which is fed through a filter means, is modulated by a mirror mounted on the coil system of a galvanometer movement which is driven by the output of the infrared detector in accordance with the radiation received from the field of view of the thermograph. A variety of different visual displays, including color or gray-tone modulation, can be obtained depending on the filter used.

BACKGROUND OF THE INVENTION

The present invention relates to an infrared camera called a thermograph of the type generally disclosed and described in U.S. Patent No. 2,895,049 entitled Image Transducer by R. W. Astheimer et al., and in application Ser. No. 635,865 entitled Infrared Thermograph by R. W. Astheimer. Such infrared thermographs are sensitive to infrared radiation, and produce a thermal image of a scanned field of view. An infrared detector is scanned over a field of view optically to produce electrical signals in accordance with infrared radiance of objects in the scanned field of view of the thermograph. The signals from the infrared detector are amplified and processed and applied to a glow modulator tube which is scanned over a light sensitive surface synchronously with the scanning of the field of view of the thermograph to provide a recorded thermal image called a thermogram. The glow modulator tube is thus intensity modulated in accordance with the signals from the infrared detector to produce a black and white picture in which the grayness of the picture is a prescribed function of the infrared radiance of objects in the scanned field of view. Although this system has proven to be quite satisfactory for a wide range of applications, certain problems exist with the use of the glow modulator tube and the intensity modulating of the brightness of such a tube. Probably the most readily apparent disadvantage would be the over-driving of the glow tube, resulting in its destruction. Though less apparent, but probably more important, are the changes in spectral characteristics which result when the glow modulator tube is driven at varying levels. These changing spectral characteristics of the glow modulator tube make it difficult to provide a light sensitive surface or film which provides the proper response in accordance with the radiation level desired to be measured and recorded. Although this problem has been treated by a compromise selection of glow modulator tubes and film in the black and white, it becomes far more severe when trying to produce color thermal images of the field of view. This problem has been treated in an application entitled Infrared Thermograph, Ser. No. 742,224, by Nelson E. Engborg et al., which is copending herewith and assigned to the assignee of the present invention. This invention offers another approach to the problem, with the advantage of being able to operate at higher speeds and requiring less driving power.

SUMMARY OF THE INVENTION

In carrying out this invention in one illustrative embodiment thereof, a constant brightness light source is modulated from the angular deflection of a small mirror of a galvanometer movement which is driven by the output of an infrared detector. The constant brightness light source is focused through a filter means by a first optical means onto a galvanometer mirror. A second optical means images the first optical means onto an aperture plate by reflection from the galvanometer mirror. A small hole in the aperture plate defines the recording scanning spot, and this spot is scanned over a light sensitive surface in synchronism with the scanning of the infrared detector over the field of view of the thermograph to produce a visual display. A variety of visual displays are possible, including color, depending on the type of filter means used.

BRIEF DESCRIPTION OF THE DRAWINGS

FIG. 1 is a schematic diagram of a thermograph embodying the light modulation system in accordance with this invention.

FIG. 2 is a schematic diagram of a side view of the light modulation system utilized in FIG. 1.

DESCRIPTION OF THE PREFERRED EMBODIMENT

Although not restricted thereto, the light modulation system for an infrared thermograph will be described with respect to the type of thermograph shown in the aforesaid Astheimer application Ser. No. 635,865. Referring now to FIG. 1, an infrared thermograph is provided having an objective lens 10 which images a field of view after reflection from a plane scannig mirror 12 onto an infrared detector 20. The plane scannig mirror 12, which is driven by a scanning drive means 14, provides an X–Y scan of the field of view of the thermograph, and radiation therefrom is applied to the infrared detector 20. The scanning drive means 14 also operates a solenoid 16 having a blackened vane 18 attached thereto. The solenoid 16 is energized after each horizontal line, which places the vane 18 in front of the detector 20 to provide a radiation reference for electronic clamping prior to each scan line. Electrical signals are generated by the infrared detector 20 in accordance with the difference in radiation received from the field of view, and are amplified and synchronously detected in processing circuitry 22. All of the aforesaid thermograph structure is similar to that set forth in the aforesaid Astheimer application and which is manufactured by Barnes Engineering Company, Stamford, Conn.

The present system differs from prior thermographs in the manner and structure utilized in producing the thermogram or visual presentation of the thermal image of the field of view of the thermograph. In the present invention, a modulation system 24 is provided which includes a fixed intensity or constant brightness light source 26 which is focused by a condensing lens 28 by reflection from a mirror 32 onto a mirror 36. The mirror 36 is part of a galvanometer 34. The galvanometer, which is not shown in detail, is conventional and operates on the principle of a coil turning in a magnetic field. In such mechanisms the coil of wire is suspended between the poles of a permanent magnet by means of a torsion filament, and electrical connections to the coil are made through the filament suspension and a flexible spiral filament fastened to the bottom of the coil. Rotation of the coil produces torsion (called the restoring force) in the filament which opposes the turning of the coil. When the movement of the restoring force and the turning movement due to the current applied to the coil are equal, the galvanometer assumes a steady deflection. The mirror 36, which is illustrated, is one method of reading the deflection of the galvanometer. For illustrative purposes, a Minneapolis-Honeywell galvanometer M3300T has been found suitable for the present application, although others may be used. A lens 38 positioned in front of the galvanometer mirror 36 images the condensing lens 28 onto an aperture plate 40 by reflection from the galvanometer mirror 36. The light incident on the mirror 36 is collimated. A small aperture or hole 42 in the aperture plate 40 defines the recording scanning spot. All of the light admitted by the aperture 42 comes from a small area of the condensing lens 28 defined by the image of the aperture 42 formed on the condensing lens 28 by the galvanometer lens 38. Angular motion of the galvanometer 34 causes this point to scan a line across the condensing lens 28. A filter means 30 is placed at the condensing lens 28 or between its elements. Accordingly, the color or intensity of the light admitted by the aperture hole 42 will be dependent upon the position of the galvanometer mirror 36. The light leaving the aperture 42 is reflected from a beam splitter 44 and applied to a concave mirror 45 which is mounted on the back of the scanning mirror 12. The concave mirror 45 images the aperture 42 on a light sensitive surface 46 such as film. The use of the beam splitter 44 locates the light source centrally with respect to the light sensitive surface plane to minimize coma. By having the concave mirror 45 on the back of the plane scanning mirror 12, scanning of the field of view of the thermograph as well as the light sensitive surface 46 are accomplished simultaneously, eliminating synchronization problems.

The type of visual presentation which may be presented depends on the type of filter means used as well as that of the light sensitive surface. For example, if the filter means is a color filter composed of six to eight sections bracketing the visible spectral range from blue to red and the light sensitive surface 46 is sensitive to color, a color presentation may be provided. Such a filter produces a quantization of the record so that successive temperature intervals appear as different discrete color regions on the visual display. Color recording makes it easier to distinguish the differences in target temperature since the ability of the eye to discern differences in color is much greater than the ability to recognize difference in intensity or gray tones. However, gray tone representation can be provided by replacing the color filter with a black and white gray scale transparency. Great flexibility is provided by the variety of filter means which may be utilized. Any of those set forth in the aforesaid Engborg application could be utilized in the present invention. Isothermal lines could be provided by placing transparent sections between the discrete filter steps of either black and white or color to produce a white isothermal line for a given intensity. Then, too, a clear section may be placed near one end of the filter to provide a hot background as disclosed in the Engborg application, as well as using an opaque section at the end of the filter for blanking the photorecording section of the instrument during retrace intervals in scanning. One of the advantages of the present invention, however, is that a stationary filter means is utilized. This eliminates weight and size problems accompanying a system which uses a movable filter means. Another advantage of the present system is the sensitivity of the galvanometer 34 which requires very little drive. The galvanometer is a sensitive instrument used for detecting and measuring small electric currents, which are the rule rather than the exception with respect to detection of infrared radiation.

Again summarizing the operation of the present invention, infrared detector 20 is scanned over a field of view of a thermograph by plane scanning mirror 12 which signals are applied to a galvanometer 34 of a modulation system 24. The deflection of the galvanometer mirror 36 in accordance with the signals received from the infrared detector modulate a fixed intensity light source 26 through a filter means 30 which, for example, may be color filter means. This is optically accomplished by focusing the light source 26 by a condensing lens onto the galvanometer mirror 36 and utilizing a galvanometer lens 38 which images the condensing lens on an aperture. The angular motion of the galvanometer causes the aperture to describe a line across the condensing lens which contains the filter element and accordingly defines the color of the light passing through the filter means 30. By changing the filter means, a large variety of visual presentations are made available to the user.

I claim:
1. An infrared thermograph for producing a thermal display in accordance with infrared radiation received from the field of view of the thermograph, comprising
   (a) an infrared detector,
   (b) scanning means for scanning said infrared detector over a predetermined field of view, said infrared detector producing signals in accordance with infrared radiation received from the field of view of the thermograph,
   (c) a constant brightness light source,
   (d) a movable mirror,
   (e) first optical means for focusing said light source on said movable mirror,
   (f) said first optical means having a stationary filter means,
   (g) an aperture,
   (h) second optical means for imaging said first optical means on said aperture,
   (i) means coupled to said detector driving said movable mirror in accordance with the signal from said detector whereby said movable mirror modulates said light source in accordance with the radiation from the field of view of the thermograph, and
   (j)) means for imaging and scanning said aperture on a light sensitive surface to produce a thermal display of the field of view of the thermograph.

2. The infrared thermograph set forth in claim 1 wherein said movable mirror and said means coupled to said detector driving said movable mirror comprise a galvanometer.

3. The infrared thermograph set forth in claim 1 wherein said first optical means comprises a condensing lens system.

4. The infrared thermograph set forth in claim 1 wherein said filter means includes a plurality of filter components either black and white or color.

References Cited
UNITED STATES PATENTS 2,895,049  7/1959  Astheimer et al. _____ 250—65
3,287,559  11/1966  Barnes _____ 250—65

RALPH G. NILSON, Primary Examiner

D. L. WILLIS, Assistant Examiner

U.S. Cl. X.R.

250—65